(No Model.) 2 Sheets—Sheet 1.
J. F. GATES.
ELECTRIC TRANSFORMER.
No. 597,180. Patented Jan. 11, 1898.
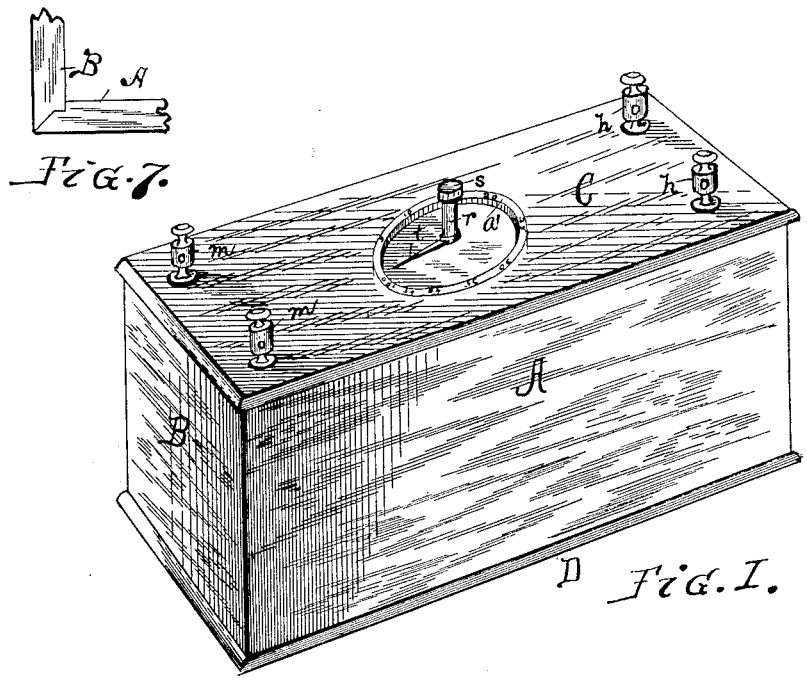
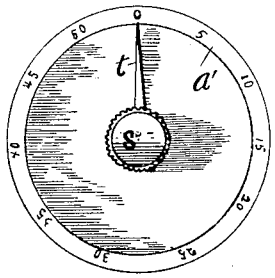
Witnesses
Frank H. Stright
 M. Wilson
Inventor
Jacob F Gates
By Henry L. Evert Attorney
THE NORRIS PETERS CO., PHOTO-LITHO., WASHINGTON, D. C.

(No Model.) 2 Sheets—Sheet 2.
J. F. GATES.
ELECTRIC TRANSFORMER.
No. 597,180. Patented Jan. 11, 1898.
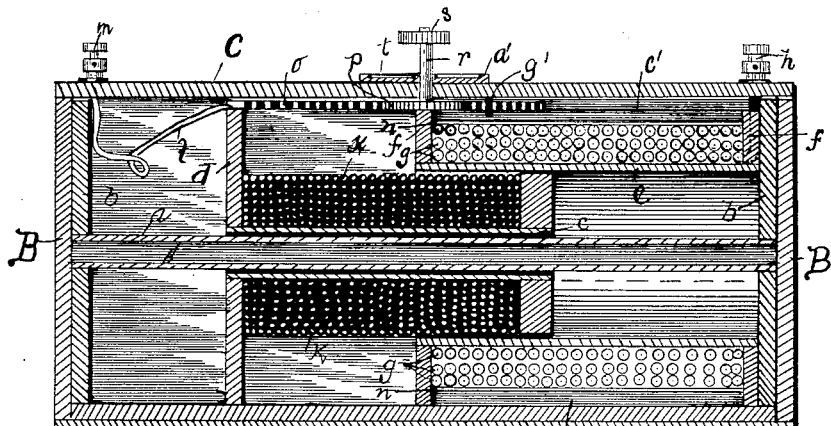
Fig. 2.
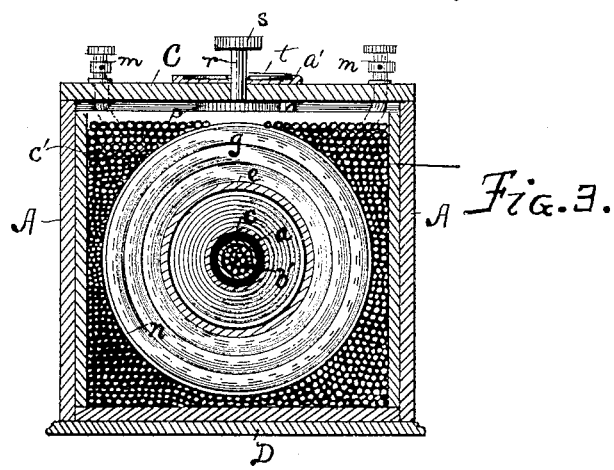
Fig. 3.
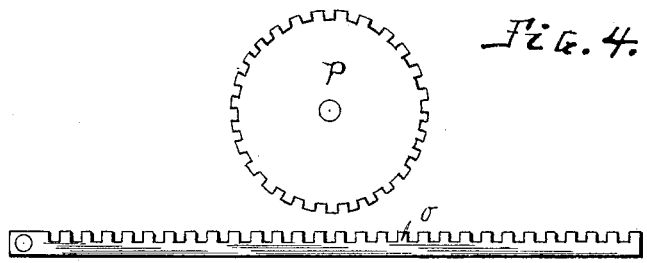
Fig. 4.
Fig. 5.
Witnesses
Frank H. Freight
A. H. Wilson
Inventor
Jacob F. Gates,
By Henry C. Evert, Attorney

UNITED STATES PATENT OFFICE.

JACOB F. GATES, OF PITTSBURG, PENNSYLVANIA.

ELECTRIC TRANSFORMER.

SPECIFICATION forming part of Letters Patent No. 597,180, dated January 11, 1898.

Application filed January 29, 1897. Serial No. 621,165. (No model.)

*To all whom it may concern:*

Be it known that I, JACOB F. GATES, a citizen of the United States of America, residing at Pittsburg, in the county of Allegheny and State of Pennsylvania, have invented certain new and useful Improvements in Converters or Transformers, of which the following is a specification, reference being had therein to the accompanying drawings.

This invention relates to certain new and useful improvements in electrical converters or transformers, and may also be referred to as a translating device for obtaining a variation of electric motive force and for covering a range of various amperage flow.

The invention has for its object to construct a device of the above nature that may be employed for various different purposes, among which may be enumerated by physicians for nasal, throat, and ear work, for burning tumors and the like, by barbers for singeing the hair, or the device may be employed for supplying miniature lamps, and for sinusodial and faradic therapeutic treatment.

Briefly describing the invention, the same consists in the novel arrangement and connections whereby the new and novel results claimed are obtained, as will be hereinafter more specifically described, and particularly pointed out in the claims.

In describing the invention in detail, reference is had to the accompanying drawings, forming a part of this specification, and wherein like letters of reference indicate similar parts throughout the several views, in which—

Figure 1 is a perspective view of my improved electrical converter or transmitting device. Fig. 2 is longitudinal sectional view of the same partly in engagement with the secondary coil. Fig. 3 is an end view with the end of casing removed. Figs. 4 and 5 are plan views of the gear and rack employed for moving the primary coil. Fig. 6 is a top plan view of the dial, operating-post, and pointer. Fig. 7 is a top plan view of a portion of the casing, showing manner in which the ends and sides of same are joined together.

Referring now to the drawings by reference-letters, $a$ represents the tube extending the entire length of the converter or transformer and supported at its ends by frame-plates $b\ b$. Arranged on this tube $a$ and adapted to slide thereon is a tube $c$, composed of any suitable non-conducting material, said tube $c$ being one-half the length of the tube $a$, and carrying on its one end a plate $d$, composed of a suitable insulating material. A non-conducting spool $e$ is provided on its ends with non-conducting flanges or plates $f\ f$, said spool being provided with a series of coils of insulated wire $g\ g$, the ends of said coils being connected to the binding-posts $h\ h$ on top of the converter or transformer. The tube $c$ is also provided with a series of coils of insulated wire $k$, which are connected through the plate $d$ by flexible cords or cables $l$ to the binding-posts $m\ m$, arranged on the top of the converter or transformer near the opposite end from the binding-posts $h\ h$.

The secondary coil, which is composed of the wires $g\ g$, is covered with a wrapping of insulating-tape $n$ or other suitable material to insulate the iron of the magnetic circuit from the wire composing the secondary coil. Secured onto the plate $d$ is a rack-bar $o$. Secured to the case is an indicator consisting of the gear-wheel $p$, engaging the rack-bar $o$, said rack-bar being also supported by a stirrup $q'$, carried on the underneath face of the cover. The gear $p$ is carried by an operating-post $r$, provided on its upper end with a thumb-nut $s$, said post carrying a pointer $t$, and arranged on the cover is a dial $a'$, showing proportionate amounts of the primary coil that is inserted into the secondary coil. The tube $a$ is provided with a filling of soft annealed iron wires $b'$ or other suitable material, having the power of producing a powerful magnetic path and generating but a small amount of heat. A filling of similar material $c'$ is provided between the tape wrapping $n$ and the frame-block $d'$. These primary and secondary coils are provided with a casing composed of wood or other suitable material, the sides of which are designated herein as A A, the ends B B, the top or cover C, and the base D, said sides, ends, and base being preferably joined together in the manner shown in Fig. 7, which gives greater strength and rigidity to the casing and also enables the same to withstand a greater resistance of heat than would otherwise be obtained.

The operation is as follows: We will assume that connections have been made with the current-wire through the binding-posts $m$ $m$ and that the primary coil is in the position shown in Fig. 2. As the primary coil is thrust into the spool of the secondary coil current is induced to flow into the winding composing the secondary coil, thus supplying a proportionate amount of current in the device attached thereto, the amount of current being regulated by the adjustment of the primary coil with the secondary coil. During the operating of the primary coil the air-gap in the aeroferric-magnetic circuit remains the same, and a greater efficiency is obtained than is accomplished by means of an aeroferric-magnetic circuit having only the core of the primary provided with a path susceptible to magnetism.

The induction effects continue in a transformer of the ferric-magnetic type after the secondary coil is opened, owing to the fact that the ferric magnetic type, being of the closed form, provides a path on which a secondary current of electricity is caused to flow and will continue to absorb from the source of supply in proportion to the size of the transformer or converter and also the grade of iron forming said ferric-magnetic path.

Having fully described my invention, what I claim as new, and desire to secure by Letters Patent, is—

1. A transformer or converter, having a primary and secondary coil, a rack and gear for moving a primary coil in contact with the secondary coil, a stationary central tube, having a filling of magnetic wires, connections between the primary coil and the main-circuit wire, and connections between the secondary coil and the object to be charged.

2. In a transformer or converter, a primary and secondary coil, means for introducing the primary coil into the secondary coil, to obtain different voltages of current, and means whereby the air-gaps in the aeroferric-magnetic circuit remain the same, substantially as shown and described.

3. A transformer or converter, having a primary and secondary coil, a rack and gear for moving the primary coil in contact with the secondary, a central tube having a filling of magnetic wires, a filling of similar magnetic wires around the secondary coil, connections between the primary coil and the main-circuit wire and connections between the secondary coil and the object to be charged, substantially as shown and described.

In testimony whereof I affix my signature in presence of two witnesses.

JACOB F. GATES.

Witnesses:
A. M. WILSON,
THOS. M. BOYD, Jr.